United States Patent [19]

Morlan

[11] Patent Number: 5,784,425
[45] Date of Patent: Jul. 21, 1998

[54] APPARATUS FOR INSPECTING A BOILING WATER REACTOR CORE SHROUD

[75] Inventor: David Eric Morlan, Marietta, Ga.

[73] Assignee: Westinghouse Electric Corporation, Pittsburgh, Pa.

[21] Appl. No.: 824,944

[22] Filed: Mar. 27, 1997

[51] Int. Cl.$^6$ .................................................. G21C 17/007
[52] U.S. Cl. .................................... 376/249; 73/640
[58] Field of Search ............................ 376/245, 249, 376/252; 73/632, 633, 637, 638, 640

[56] References Cited

U.S. PATENT DOCUMENTS 3,811,320   5/1974   Cowell ........................................ 73/633
5,586,155  12/1996   Erbes et al. ................................ 376/249

Primary Examiner—Daniel D. Wasil

[57] ABSTRACT

An inspection apparatus is suspended from a robotic positioning arm and is operable to inspect the surface of a boiling water reactor core shroud. The apparatus includes an attachment bracket connected to the robotic positioning arm. A guide is connected to the attachment bracket and receives an arcuate rail having a first end portion and an opposite second end portion. A motor assembly drives the rail within the guide to position the rail at a desired location along the core shroud surface relating to the guide. The rail carries a transducer assembly which is moved along the rail by a chain and sprocket assembly. As the motor assembly drives the rail, the chain and sprocket assembly simultaneously moves the transducer assembly along the rail to inspect the core shroud surface.

5 Claims, 3 Drawing Sheets

APPARATUS FOR INSPECTING A BOILING WATER REACTOR CORE SHROUD

BACKGROUND OF THE INVENTION

1. Field of Invention

The present invention relates generally to an apparatus useful in the maintenance and repair of a nuclear reactor and, in particular, to such an apparatus for facilitating the inspection of a boiling water reactor core shroud.

2. Background of the Invention

As is well known in the Art, the reactor core of a boiling water reactor is surrounded by a cylindrical core shroud which is typically made of stainless steel. The core shroud is fabricated from stainless steel plate segments rolled to the appropriate radius and welded to form a short cylinder. Several of these cylinders are stacked and welded to produce a completed core shroud of desired height. The core shroud is surrounded by a reactor pressure vessel, and an annular region is provided between the core shroud and the reactor pressure vessel. A multitude of jet pump assemblies are situated within this annular region and occupy most of the space within the region. As a result, there is little freely available space between the jet pump assemblies and the core shroud. Also, there is little freely available space between adjacent jet pump assemblies.

Often, it is necessary to utilize what little available free space exists between adjacent jet pump assemblies and between the jet pump assemblies and the core shroud to inspect the surface of the core shroud, and particularly the welds joining the rolled stainless steel plate segments forming the core shroud. This is due to the fact that the girth seam welds and heat affected zones around these welds have been known to occasionally experience stress corrosion cracking. Since cracking reduces the structural integrity of the core shroud, it has become industry practice to inspect the core shroud welds to determine the extent of the stress corrosion cracking and reduction in structural integrity.

A well known method for inspecting the surface of the core shroud utilizes an ultrasonic transducer. The transducer is placed adjacent to the core shroud surface and operates to send signals to and receive return signals from the core shroud. The return signals are interpreted in a well known manner to determine the extent, if any, of the cracking. Typically, it is necessary to place the transducer adjacent to the core shroud in the free space between the jet pump assemblies and the core shroud in order to perform the inspection.

Another prior art device used to implement this inspection method uses an ultrasonic transducer attached to the end of a vertically extending, long and straight arm. The arm is lowered down into the free space between the core shroud and the jet pump assemblies adjacent to the core shroud. The arm position is manipulated in the area of the annular region above the jet pumps, and as the arm moves the transducer along the surface of the core shroud the transducer transmits signals to and receives signals from the core shroud. As may be appreciated, the arm must be relatively long in order to reach all desired inspection locations. Since the arm is fixed at one end above the jet pumps and free to move at the transducer end, the transducer end may not move in direct concert with the fixed end since the transducer may drag over the core shroud surface. Thus, it may be difficult to precisely position the transducer adjacent to the shroud in the desired inspection location. Further, it may not be possible to inspect weld locations as the arm is re-positioned since the transducer has a tendency to stick and then jump over the core shroud surface. At times when the transducer experiences this "sticking" and "jumping" action over an area of the core shroud surface it will likely collect unusable data over that area. As described, this prior art device has a limitation in that its use may produce unreliable inspection data. Further, since it may sometimes be difficult to determine precisely when during the inspection operation this unreliable data is actually generated, it may be difficult to distinguish good inspection data from unusable inspection data.

A second prior art device has also used to perform a BWR core shroud inspection. The second prior art device uses an ultrasonic transducer which rides along a curved rail to inspect the core shroud welds. The rail is fixed to and suspended from a robotic arm which is inserted into the free space between the adjacent jet pump assemblies and subsequently positioned into the free space between the core shroud and the jet pump assemblies. The rail is placed adjacent to the core shroud, and the transducer is moved along the rail by a motor-driven chain and sprocket assembly. With this rail design, transducer travel is limited to substantially the length of the rail. As a result, it is necessary to frequently re-position the rail to inspect the overall length of the core shroud weld. The overall length of the rail must be limited to assure that the rail and transducer closely follow the contour of the shroud and to insure that the rail may be moved within the available free space between adjacent jet pump assemblies. It has been found that with this typed of "fixed" rail arrangement inspection of the entire weld length between adjacent jet pump assemblies is not possible without at least one repositioning movement of the robotic arm supporting the rail/transducer assembly.

As described, the prior art devices used to implement the inspection of BWR core shroud welds are not without their shortcomings. Therefore, there is a need for an improved inspection apparatus which overcomes these limitations by increasing the length of travel of the transducer along the rail without increasing the rail length. This improvement will reduce the need to frequently re-position the rail during the inspection, and this in turn will reduce overall inspection time and save money in inspection costs. Further, the improved inspection apparatus of the present invention will permit the inspection of the full core shroud weld length between adjacent jet pumps assemblies without requiring the movement of the robotic arm supporting the rail/transducer assembly.

SUMMARY OF THE INVENTION

The present invention is directed to an apparatus designed to satisfy the aforementioned needs. The present invention is an apparatus for inspecting the welds of a BWR core shroud which reduces the need to frequently re-position the rail by allowing the rail to move relative to the robotic positioning arm while simultaneously allowing the transducer to move along the rail. As a result, the transducer will travel almost twice the distance of known prior art devices before it is necessary to re-position the rail by movement of the supporting robotic arm. Also, since the rail moves relative to the robotic positioning arm, the present invention can inspect the full weld length between adjacent jet pump assemblies without robotic positioning arm movement.

The present invention is directed to an apparatus suspended from a robotic positioning arm and operable to be placed adjacent to the core shroud of a BWR reactor to inspect the core shroud welds. The apparatus includes means for attaching a guide to the robotic positioning arm. The guide receives an accurate rail which moves relative to the guide between the first end portion of the rail and the second end portion of the rail. First means associated with the guide moves the rail relative to the guide. The rail may travel over substantially its entire length through the guide since the rail may be moved from a first position relative to the core shroud in which the rail's first end portion is located within the guide and its second end portion is fully extended away from the guide, to a second position relative to the core shroud in which the rail's second end portion is located within the guide and its first end portion is fully extended away from the guide.

A transducer assembly is received by is capable of moving and moved along the rail. As the first means moves the rail relative to the guide, second means moves the transducer assembly along the rail between the rail's first and second end portions. The second means moves the transducer assembly over substantially the full length of the rail, thus allowing the transducer to inspect substantially the entire length of the weld that can be accessed as the rail is moved relative to the guide.

DESCRIPTION OF THE DRAWINGS

The above as well as other features and advantages of the present invention will become apparent through consideration of the detailed description in connection with the accompanying drawings in which.

DESCRIPTION OF THE PREFERRED EMBODIMENT

Figure 1:
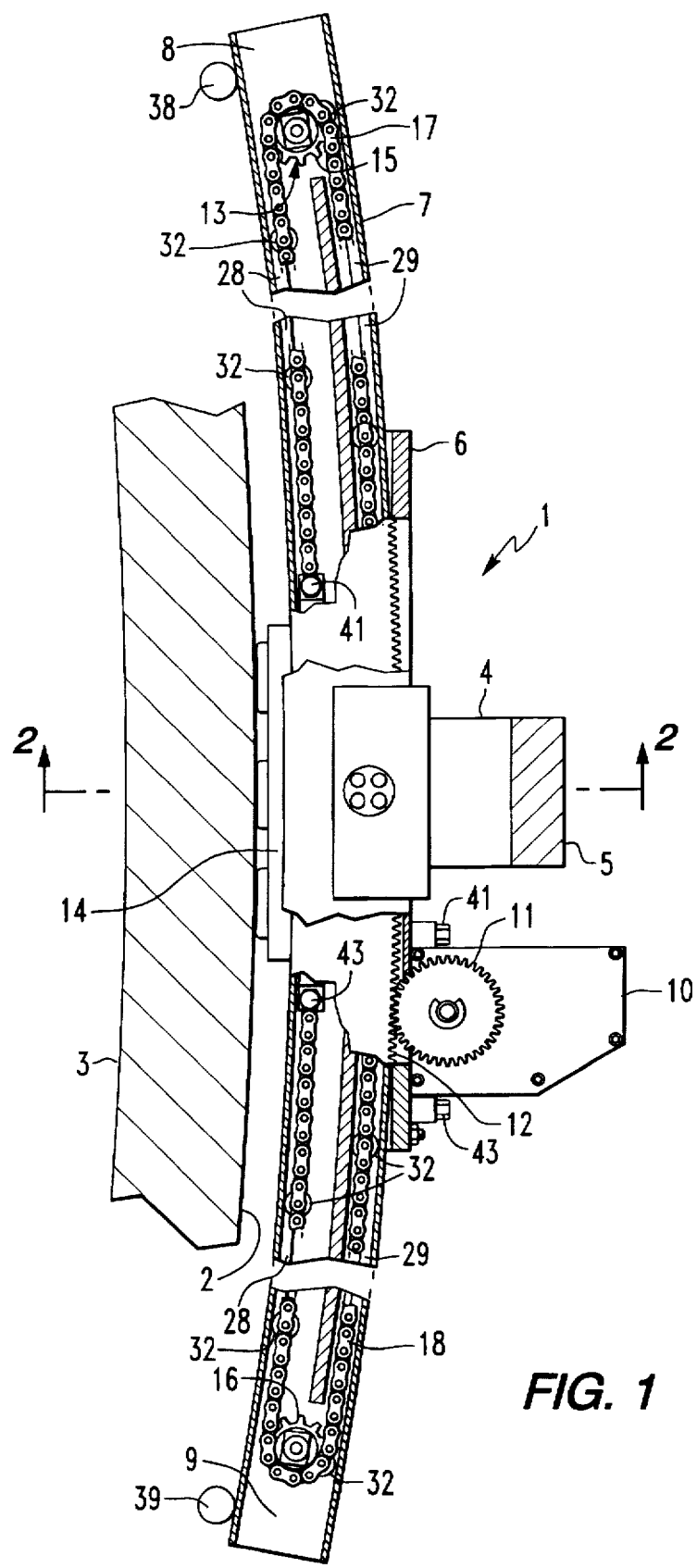
FIG. 1 is a top plan view, partially in section, of the inspection apparatus of the present invention.

Referring to the drawings and particularly to FIG. 1, there is illustrated a top plan view, partially in section, of the inspection apparatus (1) of the present invention operable to permit the inspection of the surface of a Boiling Water Reactor (BWR) core shroud. As illustrated in FIG. 1, the inspection apparatus (1) is positioned adjacent to the surface (2) of a BWR core shroud (3) in preparation for inspecting the various welds joining the individual rolled stainless steel plates forming the core shroud (3). An attachment bracket (4) connects the inspection apparatus (1) to a robotic positioning arm (5) which extends vertically in the available free space between the core shroud (3) and a plurality of jet pump assemblies (not shown) typically used in BWR applications.

The robotic positioning arm (5) is operable upon selected movement to position the inspection apparatus (1) at any location along the core shroud surface (2). A guide (6) is connected to the attachment bracket (4) and receives an arcuate rail (7), which has a first end portion (8) and an opposite second end portion (9).

A motor assembly (10) is mounted on the guide (6) and is operable to drive a gear (11). The gear (11) engages a gear rack (12) which extends along the length of the rail (7) between the rail first end portion (8) and the rail second end portion (9). As the motor assembly (10) drives the gear (11), the gear (11) engages the gear rack (12) and causes movement of the rail (7) within and relative to the guide (6).

As the gear (11) operates to move the rail (7) relative to the guide (6), a chain and sprocket assembly generally designated by the numeral (13) also operates to move a transducer assembly (14) along the rail (7) between the rail first end portion (8) and the rail second end portion (9). As the transducer assembly (14) moves, the individual transducers of the transducer assembly (14) may be operated in a well known manner to transmit to and receive ultrasonic signals from the core shroud (3). These ultrasonic signals are used to interpret the structural integrity of the core shroud (3), and particularly the structural integrity of the welds (not shown) which join the individual stainless steel plates forming the core shroud (3).

The chain and sprocket assembly generally designated by the numeral (13) includes a first sprocket (15) located at the rail first end portion (8) and a second sprocket (16) located at the rail second end portion (9). A first chain (17) is fastened to the guide (6) adjacent to the area of the attachment bracket (4) (specific attachment mechanism not shown) and is positioned to extend from the guide (6) into an inner chain groove (29) within the rail (7) and over the first sprocket (15). The first chain (17) continues along an outer chain groove (28) within the rail (7) and is connected to the transducer assembly (14) by suitable means such as by the bolt (41). A second chain (18) is also fastened to the guide (6) adjacent to the area of the motor assembly (10) (specific attachment mechanism not shown) and is positioned to extend from the guide (6) into the inner chain groove (29) within the rail (7) and over the second sprocket (16). The second chain (18) continues along an outer chain groove (28) within the rail (7) and is connected to the transducer (14) assembly by suitable means such as by the bolt (43). The first chain (17) and the second chain (18) each are equipped with a plurality of chain rollers (32) which facilitate the movement of the first and second chains (17, 18) within the inner and outer chain grooves (29, 28).

Movement of the rail (7) and the transducer assembly (14) within the guide (6) is accomplished as follows. As the gear (11) is turned by operation of the motor assembly (10) to cause the rail (7) to move within the guide (6) in a direction so that the rail first end portion (8) moves away from the guide (6), the first chain (17) passes over the first sprocket (15) in a clockwise direction and pulls the transducer assembly (14) in the direction of the rail (7) movement. The transducer assembly (14) is forced to move in the same direction as the rail (7) moves since the transducer assembly (14) is connected with the first chain (17) via the bolt (41). As the first chain (17) moves, the transducer assembly (14) also pulls the second chain (18) since these components are connected via the bolt (43). This pulling action causes the second chain (18) to pass over the second sprocket (16) in a clockwise direction. Conversely, as the gear (11) is turned by operation of the motor assembly (10) to cause the rail (7) to move within the guide (6) in a direction so that the rail second end portion (9) moves away from the guide (6), the second chain (18) passes over the second sprocket (16) in a counter-clockwise direction and pulls the transducer assembly (14) in the direction of the rail (7) movement. The transducer assembly (14) is forced to move in the same direction as the rail (7) moves since the transducer assembly (14) is connected with the second chain (18) via the bolt (31). As the second chain (18) moves, the transducer assembly (14) also pulls the first chain (17) since these components are connected via the bolt (30). This causes the first chain (17) to pass over the first sprocket (15) in a counter-clockwise direction.

As seen in FIG. 1, the rail (7) includes a first stabilizer knob (38) attached to the rail first end portion (8) and a second stabilizer knob (39) attached to the rail second end portion (9). In preparation for operation of the inspection apparatus (1), the first and second stabilizer knobs (38, 39) are brought into contact with the surface (2) of the core shroud (3) prior to movement of the rail (7) and transducer assembly (14). The first and second stabilizer knobs (38, 39) are utilized to prevent the rail (7) from "tipping" or twisting as the transducer assembly (14) moves along the rail (7), and also to ensure that all locations along the surface of the rail (7) facing the surface (2) are an equally spaced from the surface (2).

As described, the motor assembly (10) is operable through rotation of the gear (11) to move the rail (7) relative to the guide (6) in an arcuate path adjacent to the surface (2) of the core shroud (3) between a first position relative to the core shroud (3) where the first end portion (8) of the rail (7) is extended away from the guide (6), and a second position relative to the core shroud (3) where the second end portion (9) of the rail (7) is extended away from the guide (6). Movement of the rail (7) between the first and second positions relative to the guide (6) causes corresponding movement of the transducer assembly (14) between the same first and second positions. As should be apparent, the rail (7) may be located at any position relative to the guide (6) so that the transducer assembly (14) may be positioned at any selected location along substantially the entire length of the rail (7). If desired, the rail (7) may be moved in reciprocating fashion between the first and second locations thereby causing the transducer assembly (14) to move along the surface of the core shroud (3) a distance substantially twice the length of the rail (7). With this type of movement, the transducer assembly (14) may be operated to inspect core shroud welds which extend over a distance substantially equal to twice the length of the rail (7) without repositioning the rail (7) upon movement of the robotic positioning arm (5).

Figure 2:
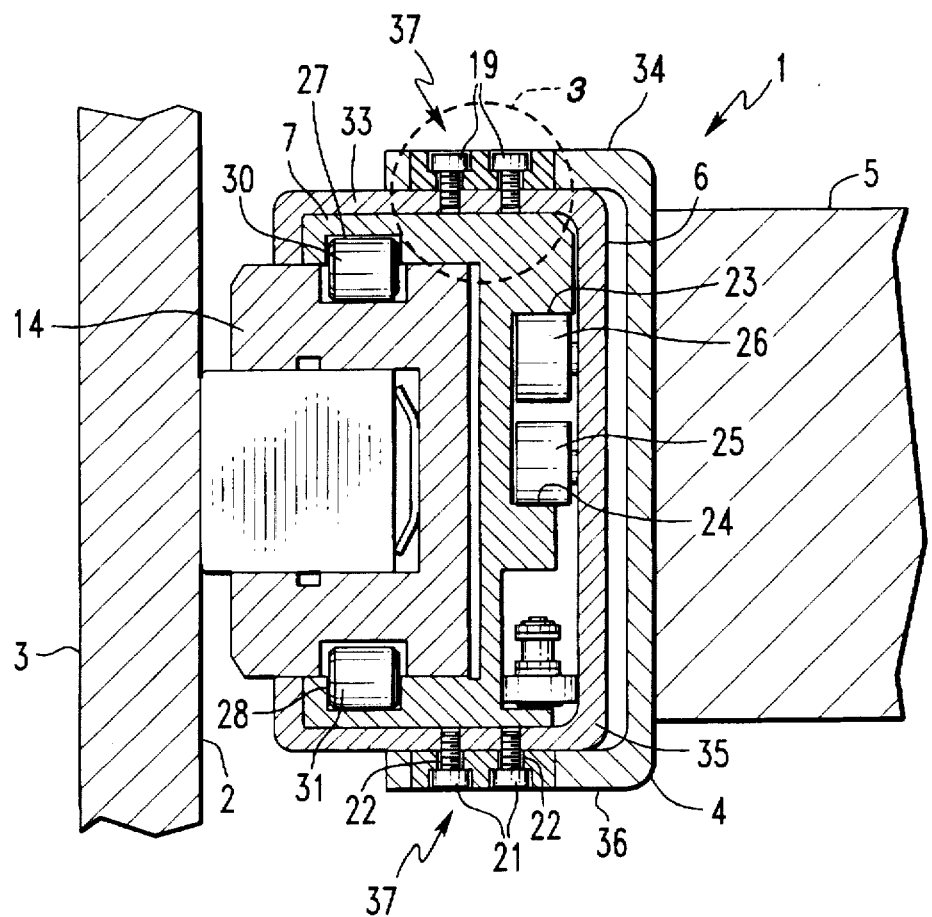
FIG. 2 is a side elevational view in section of the inspection apparatus of the present invention as taken along line 2—2 of FIG. 1.
Figure 3:
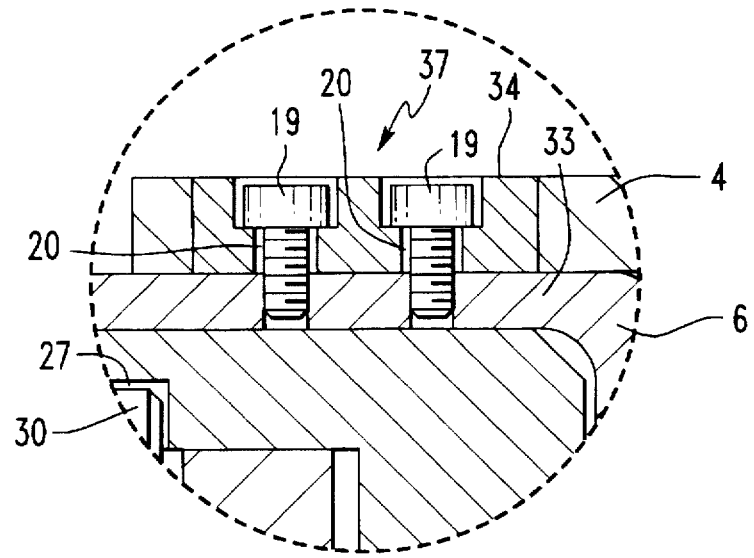
FIG. 3 is an enlarged view of the pivot assembly between the guide and the attachment means of the inspection apparatus of the present invention.

Now referring to FIG. 2, there is illustrated a side elevational view in section of the inspection apparatus (1) as taken along line 2—2 of FIG. 1. The robotic positioning arm (5) is connected to the attachment bracket (4) and the guide (6) is connected for pivotal movement within the attachment bracket (4) by means of a pair of upper and lower pivot assemblies (37). The upper and lower pivot assemblies (37) are identical in construction. The upper pivot assembly (37) is enlarged for clearer viewing in FIG. 3. As seen particularly in FIG. 3, an upper portion (34) of the attachment bracket (4) is connected with an upper portion (33) of the guide (6) by means of four upper pivot bolts (19) (only two of which are shown in FIGS. 2 and 3). The upper pivot bolts (19) are threaded into the guide (6) with their enlarged headed end portions located within upper openings (20) formed in the upper portion (34) of the attachment bracket (4). Referring again to FIG. 2, there is shown an identical lower pivot assembly (37) wherein a lower portion (36) of the attachment bracket (4) is connected to a lower portion (35) of the guide (6) by four lower pivot bolts (21) (only two of which are shown in FIG. 2). The lower pivot bolts (21) are threaded into the guide (6) with their enlarged headed end portions located within lower openings (22) formed in the lower portion (36) of the attachment bracket (4). The upper pivot bolts (19) move freely within the upper openings (20) and the lower pivot bolts (21) move freely within the lower openings (22) of the attachment bracket (4), thus allowing the guide (6) to pivot relative to the attachment bracket (4). The pivotal movement facilitates the inspection of the surface (2) of the BWR core shroud (3) by allowing the rail (7) and the transducer assembly (14) to move as required relative to the robotic positioning arm (5) as the transducer assembly (14) closely follows the contour of the surface (2) of the core shroud (3).

As also seen in FIG. 2, the rail (7) is positioned within the guide (6) and moves along rotatable upper and lower cam rollers (26, 25) which are attached to the guide (6) and positioned, respectively, within an upper cam groove (23) and a lower cam groove (24) formed along the rail (7). The upper and lower cam grooves (23, 24) each extend along the rail (7) between the rail first and second end portions (8, 9). Although in FIG. 2 there is illustrated only one upper cam roller (26) and one lower cam roller (25), it should be understood that more than one roller is ideally positioned within each of the upper and lower cam grooves (23, 24). As the gear (11) engaging the gear rack (12) is rotated by operation of the motor assembly 10 illustrated in FIG. 1, the rail (7) moves over the upper and lower cam rollers (26, 25). The upper and lower cam rollers (26, 25) provide for smooth and free movement of the rail (7), and this type of movement permits more precise control over rail (7) movement.

FIG. 2 further illustrates the rail (7) as including an upper transducer assembly groove (27) formed within the rail (7). Although not shown in FIG. 2, the upper transducer groove (27) extends along substantially the entire length of the rail (7) between the rail (7) first and second end portions (8,9). An upper transducer roller (30) is connected with the transducer assembly (14) so as to be positioned within the upper transducer groove (27) in the rail (6) upon assembly. Also, a lower transducer roller (31) is connected with the transducer assembly (14) and is positioned within the outer chain groove (28) previously described with respect to FIG. 1. As the chain and sprocket assembly (13) is activated to move the transducer assembly (14) along the rail (7), movement of the transducer assembly (14) along the rail (7) is facilitated by the rotation of the upper transducer roller (30) within the upper transducer groove (27) and the movement of the lower transducer roller (31) within the lower chain groove (28).

Figure 4A:
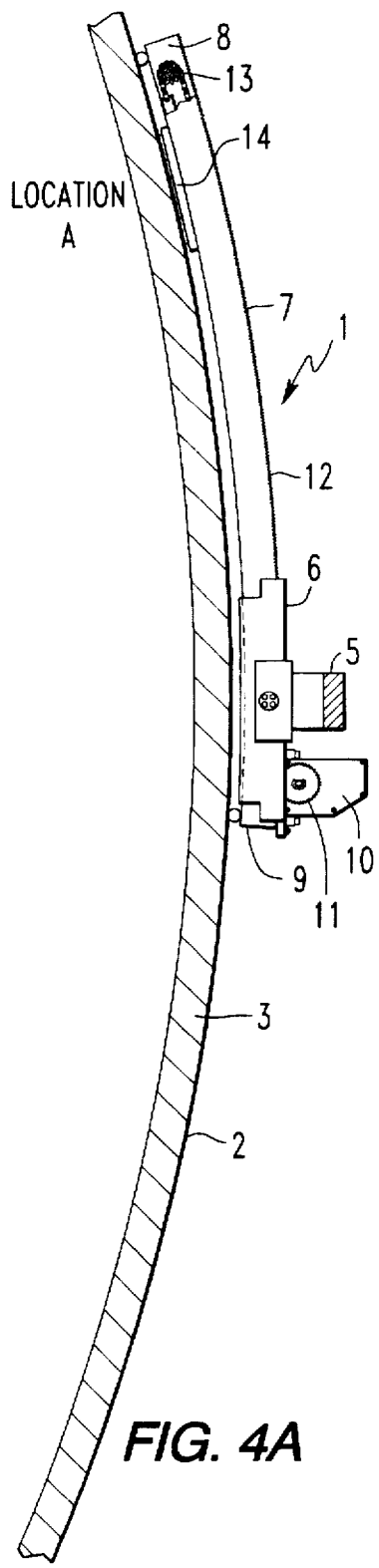
FIG. 4A shows the inspection apparatus of the present invention positioned adjacent to the surface of a BWR core shroud with the second end of the rail fully extended away from the guide and the transducer assembly positioned at the second end of the rail.

Referring now to FIG. 4A, the configuration of the inspection apparatus (1) of the present invention is shown as it is typically positioned by the robotic positioning arm (5) adjacent to the surface (2) of the core shroud (3). The rail first end portion (8) is fully extended away from the guide (6) and the rail second end portion (9) is positioned at the guide (6). The transducer assembly (14) is located at the rail first end portion (8) at a position designated as LOCATION A along the core shroud surface (2). After the inspection apparatus (1) is positioned, the motor (10) is operated to drive the gear (11) which moves the rail first end portion (8) towards the guide (6). As the rail (7) is moved, the chain and sprocket assembly (13) moves the transducer assembly (14) along the rail (7) in the same direction as the direction of the rail (7) movement.

Figure 4B:
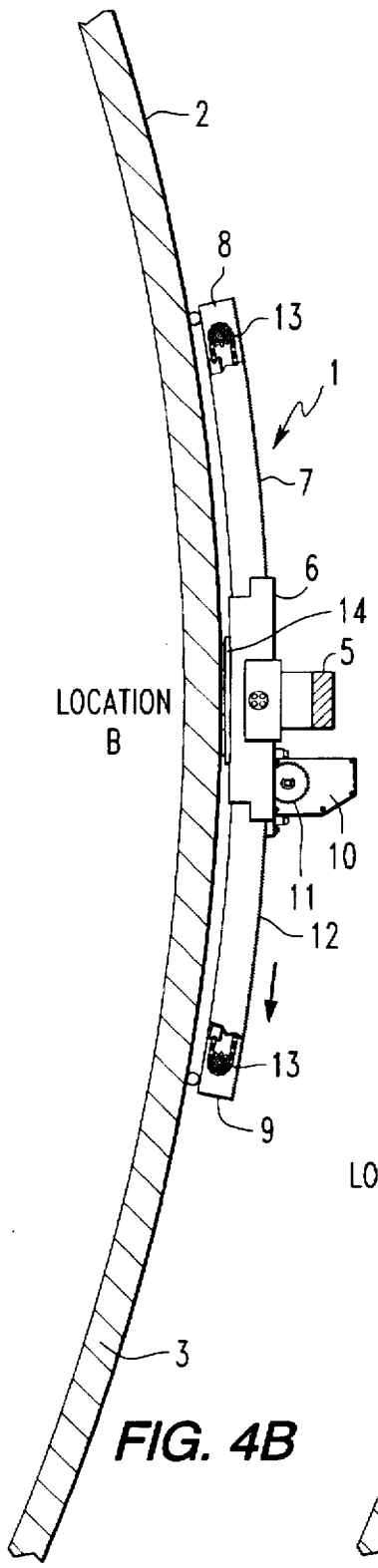
FIG. 4B shows the inspection apparatus of the present invention positioned adjacent to the surface of a BWR core shroud with the rail centered within the guide and the transducer assembly positioned in the middle of the rail.

Referring now to FIG. 4B. the configuration of the inspection apparatus (1) is shown after operation of the motor (10) has moved the rail (7) from the position illustrated in FIG. 4A to a position substantially centered on the guide (6). Movement of the rail (7) has caused a simultaneous movement of the transducer assembly (14) to the middle of the rail (7) designated as LOCATION B on the core shroud surface (2). As the transducer assembly (14) moves from LOCATION A to LOCATION B. the transducer assembly (14) is operated in a well known manner to inspect the core shroud surface (2) adjacent to the transducer assembly (14) between LOCATION A and LOCATION B.

Figure 4C:
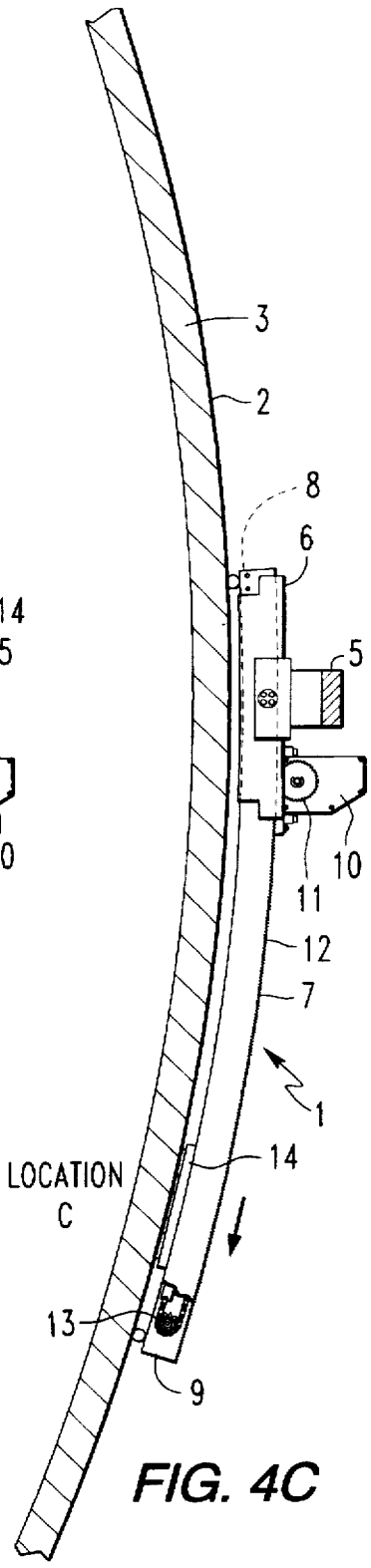
FIG. 4C shows the inspection apparatus of the present invention positioned adjacent to the surface of a BWR core shroud with the first end of the rail fully extended away from the guide and the transducer assembly positioned at the first end of the rail.

Referring now to FIG. 4C, the inspection apparatus (1) is shown after operation of the motor (10) has moved the rail (7) from the position illustrated in FIG. 4B to a position where the rail second end portion (9) is fully extended away from the guide (6) and the rail first end portion (8) is positioned at the guide (6). Operation of the chain and sprocket assembly (13) has moved the transducer (14) from the middle of the rail (7) designated as LOCATION B on the core shroud surface (2) to the rail second end portion (9) designated as LOCATION C on the core shroud surface (2). As the transducer assembly (14) moves from LOCATION B to LOCATION C, the transducer assembly (14) is operated in a well known manner to inspect the core shroud surface (2) adjacent to the transducer assembly (14) between LOCATION B and LOCATION C.

The present invention provides many advantages over the prior art. For example, use of the inspection apparatus (1) of the present invention decreases overall BWR core shroud inspection time by reducing the need to frequently re-position the inspection apparatus. The inspection apparatus (1) of the present invention can inspect almost twice as much core shroud surface as the prior art device before requiring repositioning, and thus, it's use increases the inspection coverage range between adjacent jet pump assemblies per each movement of the inspection apparatus. As a result, the present invention saves time and results in reduced costs of inspection. Use of the inspection apparatus (1) of the present invention also reduces the opportunity for operator error during the inspection process since fewer operator actions are required to move the inspection apparatus along (1) the core shroud surface.

While a specific embodiment of the invention has been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

I claim:

1. An apparatus suspended from a positioning arm and operable to inspect the surface of a boiling water reactor core shroud, comprising:
   a. attachment means fixed to said positioning arm;
   b. a guide connected with said attachment means;
   c. an arcuate rail received by said guide and having a first end portion and an opposite second end portion;
   d. first means for moving said rail relative to said guide in an arcuate path adjacent to said surface of said core shroud between a first position relative to said guide and a second position relative to said guide;
   e. a transducer received by and moveable along said rail; and
   f. second means for moving said transducer along said rail between said rail first end portion and said rail second end portion as said first means moves said rail between said first position and said second position.

2. The apparatus as recited in claim 1 wherein said first means comprises:
   a. a gear rack extending along said rail between said rail first end portion and said rail second end portion; and
   b. a motor assembly mounted on said guide and operable to turn a drive gear engaging said gear rack and thereby move said rail relative to said guide upon operation of said motor assembly.

3. The apparatus as recited in claim 1 wherein:
   a. said attachment means is a bracket fixed to said positioning arm and having a upper opening and a lower opening; and
   b. said guide pivots within said bracket by at least one first pivot bolt connected to said guide and positioned within said bracket upper opening and least one second pivot bolt connected to said guide and positioned within said bracket lower opening.

4. The apparatus as recited in claim 1, wherein:
   a. said rail is designed so as to define a groove extending along said rail between said rail first end portion and said rail second end portion; and
   b. at least one cam roller is attached to said guide and positioned within said groove to facilitate movement of said rail relative to said guide along said at least one cam roller.

5. The apparatus as recited in claim 1, further including a first stabilizer knob connected with said rail at said rail first end portion and a second stabilizer knob connected to said rail at said rail second end portion to provide uniform spacing between said rail and said core shroud with said rail in position to allow said transducer assembly to inspect said surface of said core shroud.

* * * * *